(No Model.)

J. W. VILES.
PLOW.

No. 597,626.

Patented Jan. 18, 1898.

Witnesses
Victor J. Evans.
V. B. Hillyard

Inventor
Joseph W. Viles
By his Attorneys, C. A. Snow & Co.

UNITED STATES PATENT OFFICE.

JOSEPH W. VILES, OF GOODSON, MISSOURI.

PLOW.

SPECIFICATION forming part of Letters Patent No. 597,626, dated January 18, 1898.

Application filed April 22, 1897. Serial No. 633,246. (No model.)

*To all whom it may concern:*

Be it known that I, JOSEPH W. VILES, a citizen of the United States, residing at Goodson, in the county of Polk and State of Missouri, have invented a new and useful Plow, of which the following is a specification.

Plows as generally constructed produce a furrow whose bottom is smooth and somewhat compressed, thereby turning water instead of permitting the same to penetrate the soil and keep the ground moist, which is essential to a full harvest.

The purpose of this invention is to combine with a breaking-plow a series of subplows or points disposed so as to prevent the formation of a smooth bottom to the furrow as the plow is drawn over the field, whereby water is caused to penetrate the soil instead of being turned aside, as is the case when the land is tilled or broken by a plow of ordinary construction.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
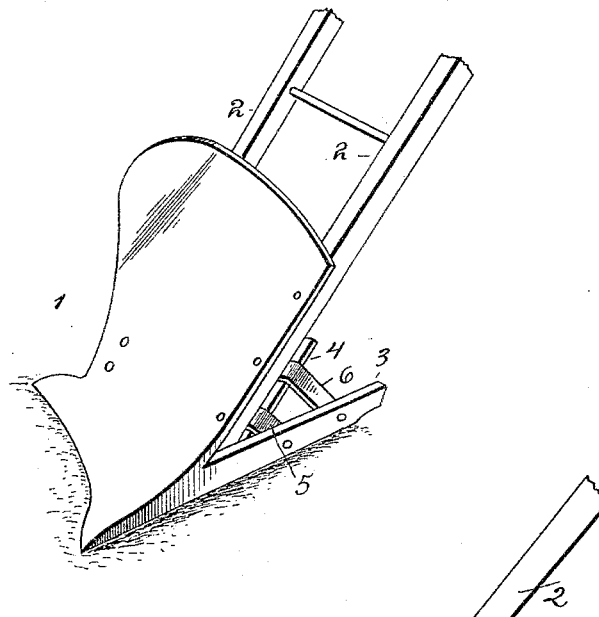
Figure 2:
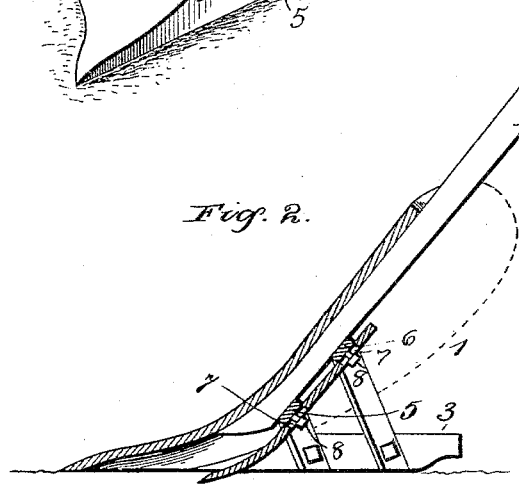
Figure 3:
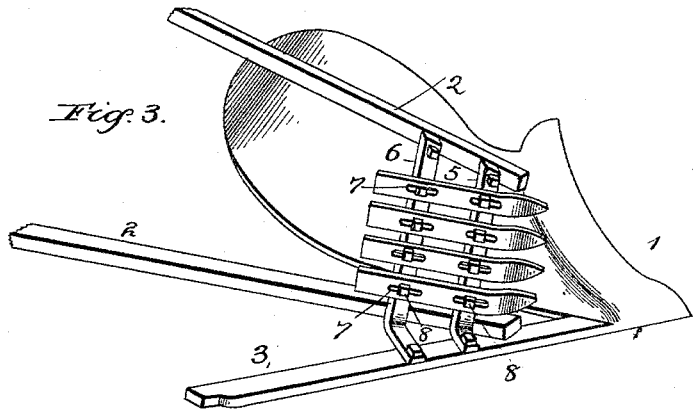

Figure 1 is a perspective view of a plow, showing the improvement in position. Fig. 2 is a longitudinal section. Fig. 3 is a view of the plow inverted.

Corresponding and like parts are referred to in the following description and indicated in the several views of the drawings by the same reference-characters.

The plow 1 is of the type generally employed for breaking land, and comprises a point, share, and moldboard, and is directed by handles 2, and is held against lateral movement when turning the furrow by means of a landside 3.

A series of subplows 4, of suitable design and construction, are located a proper distance below the plow and are connected therewith, and are secured to transverse bars 5 and 6 in such a manner as to be adjusted longitudinally to compensate for wear and regulate the depth of the action of the subsoilers below the bottom of the furrow defined by the cutting edge of the share. These subplows have longitudinal slots 7, through which pass bolts 8, by means of which they are adjustably connected with the transverse bars 5 and 6. The transverse bars are secured at one end to the landside and at their opposite end to the moldboard of the plow and are disposed at different relative levels, the rear bar 6 being higher than the front bar 5, whereby a pitch is given to the subplows 4. The handles 2 are secured to the plow in any convenient manner, so as to properly direct it when drawn over the field.

The subplows, as will be readily seen, having their active ends projecting below the cutting edge of the plow 1, enter and break up the bottom of the furrow, which is thereby loosened to such an extent that water will penetrate and moisten the land, thereby resulting in a larger crop than if the land were tilled by a plow of ordinary construction in the usual way.

Having thus described the invention, what is claimed as new is—

1. The combination with a plow for breaking land, of subplows for preventing the formation of a smooth-bottomed furrow, and having their active ends projecting below a plane projecting horizontally through the cutting edge of the share, substantially as specified.

2. The combination with a plow for breaking land, of subplows having adjustable connection with said plow and adapted to prevent the formation of a smooth-bottomed furrow and placed beneath the share and in the rear of its cutting edge, and having their active ends projecting below a plane passing horizontally through the cutting edge of the share, substantially as described.

3. The combination with a plow for breaking land, of a transverse bar located beneath the plow, and a series of points or plows applied to the transverse bar and adapted to operate in the rear of and a distance below the cutting edge of the share, substantially in the manner and for the purpose specified.

4. In combination, a plow for breaking land, transverse bars secured to the under side of the plow and arranged at different relative levels, and subplows having adjustable connection with the transverse bars, substantially in the manner set forth for the purpose described.

In testimony that I claim the foregoing as my own I have hereto affixed my signature in the presence of two witnesses.

JOSEPH W. VILES.

Witnesses:
   J. C. CLARK,
   T. C. HATTER.